(12) United States Patent
Das et al.

(10) Patent No.: US 12,549,419 B2
(45) Date of Patent: Feb. 10, 2026

(54) METHODS AND CIRCUITS FOR CONTROLLING MULTICYCLE PATH IN SERIALIZER INTERFACE

(71) Applicant: Samsung Electronics Co., Ltd., Suwon-si (KR)

(72) Inventors: Tamal Das, Bangalore (IN); Saikat Hazra, Bangalore (IN); Sanjeeb Kumar Ghosh, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 310 days.

(21) Appl. No.: 18/355,731

(22) Filed: Jul. 20, 2023

(65) Prior Publication Data

US 2024/0422458 A1 Dec. 19, 2024

(30) Foreign Application Priority Data

Jun. 14, 2023 (IN) .............................. 202341040507

(51) Int. Cl.
*H04L 25/49* (2006.01)
*H03K 3/037* (2006.01)

(52) U.S. Cl.
CPC ......... *H04L 25/4917* (2013.01); *H03K 3/037* (2013.01); *H04Q 2213/13036* (2013.01)

(58) Field of Classification Search
CPC ................................................ H04L 25/4917
See application file for complete search history.

(56) References Cited

U.S. PATENT DOCUMENTS

| 8,324,949 | B2 | 12/2012 | Cherkassky et al. |
| 8,847,691 | B2 | 9/2014 | Zhu et al. |
| 9,571,106 | B2 | 2/2017 | Seo et al. |
| 10,547,315 | B2 | 1/2020 | Choi et al. |
| 11,139,805 | B1 | 10/2021 | Shan et al. |
| 2009/0259781 | A1* | 10/2009 | Padaparambil ........ H03K 5/135 710/71 |
| 2022/0385444 | A1 | 12/2022 | Yue et al. |

* cited by examiner

*Primary Examiner* — Patrick O Neill
(74) *Attorney, Agent, or Firm* — Harness, Dickey & Pierce, P.L.C.

(57) ABSTRACT

Various example embodiments herein provide methods, circuits, and systems, for controlling a multicycle path in a serializer interface. The method includes determining a desired delay window of a multicycle data path in a serializer interface by sampling at least one step response from serializer delay replica circuitry at an edge of a first clock signal and a gating signal, in response to synchronizing a second clock signal with a negative edge of the first clock signal, configuring a polarity of a latch in a subsequent serializer of a serializer chain based on the determined desired delay window, and controlling the multicycle data path in the serializer interface based on the configured polarity of the latch in the subsequent serializer of the serializer chain.

14 Claims, 15 Drawing Sheets

METHODS AND CIRCUITS FOR CONTROLLING MULTICYCLE PATH IN SERIALIZER INTERFACE

CROSS-REFERENCE TO RELATED APPLICATION

This U.S. non-provisional application claims the benefit of priority under 35 U.S.C. § 119 to Indian Patent Application No. 202341040507, filed on Jun. 14, 2023 in the Indian Patent Office, the entire disclosure of which is incorporated by reference herein.

BACKGROUND

Various example embodiments of the inventive concepts relate to a serializer interface, and more particularly to serializer interfaces, methods of operating a serializer interface, circuits for controlling a multicycle path in the serializer interface, and/or systems including the serializer interfaces.

SUMMARY

At least one example embodiment of the inventive concepts is directed to methods of operating a serializer interface, circuits for controlling a multicycle path in a serializer interface, and/or systems including the serializer interface, etc.

At least one example embodiment of the inventive concepts is directed to a delay detection scheme (e.g., method, process, etc.) to enable and/or disable a multi-cycle path for a 224 Gbps PAM4 serializer at a C8 interface.

At least one example embodiment of the inventive concepts is directed to a replica based synchronous delay detection scheme.

At least one example embodiment of the inventive concepts is directed to a method for determining a desired and/or optimal delay window by sampling at least one step response from the serializer delay replica unit at an edge of a first clock and a gating signal upon synchronizing a second clock with a negative edge of the first clock.

At least one example embodiment of the inventive concepts is directed to a method for configuring a polarity of a latch in a subsequent serializer of a serializer chain based on the determined desired and/or optimal delay window.

At least one example embodiment of the inventive concepts is directed to a method of controlling the multicycle path in the serializer interface based on the configured polarity of the latch in the subsequent serializer of the serializer chain.

At least one example embodiment of the inventive concepts is directed to a method of controlling a direction of a clock of a latch for the multicycle path in the serializer interface upon detecting the delay of a replica serializer.

Accordingly, at least one example embodiment herein disclose a method for controlling a multicycle path in a serializer interface, e.g., a 224 Gbps PAM4 serializer interface, but not limited thereto. The method includes determining a desired delay window of a multicycle data path in a serializer interface by sampling at least one step response from serializer delay replica circuitry at an edge of a first clock signal and a gating signal, in response to synchronizing a second clock signal with a negative edge of the first clock signal, configuring a polarity of a latch in a subsequent serializer of a serializer chain based on the determined desired delay window, and controlling the multicycle data path in the serializer interface based on the configured polarity of the latch in the subsequent serializer of the serializer chain.

In at least one example embodiment, the first clock signal is a C8 clock signal, and the second clock signal is a C16 clock signal.

In at least one example embodiment, wherein the configuring the polarity of the latch in the subsequent serializer of the serializer chain further includes, configuring the polarity to be a positive polarity in response to a data delay of the sampled at least one step response is less than 0.5 unit interval (UI).

In at least one example embodiment, wherein the configuring the polarity of the latch in the subsequent serializer of the serializer chain further includes, configuring the polarity to be a negative polarity in response to a data delay of the sampled at least one step response being greater than 0.5 UI.

In at least one example embodiment, wherein the determining the desired delay window includes using a plurality of samples.

In at least one example embodiment, the method further comprises determining whether a total path delay is observed to be within 0.5 clock period to 1.5 clock period, and replacing a positive edge triggered flop with a negative edge triggered flop based on results of the determining.

In at least one example embodiment, the serializer delay replica unit includes replica last stage circuitry coupled to a plurality of complementary metal-oxide semiconductor (CMOS) buffers, each CMOS buffer from the plurality of CMOS buffers is coupled to each D-flip-flop from a plurality of D-flip-flops, respectively, each of the D-flip-flops configured to provide an output signal to voting mechanism circuitry, and the voting mechanism circuitry is configured to provide a voting signal to a C8TX replica circuit.

In at least one example embodiment, the voting mechanism determines how many of the plurality of D-flip-flops says delay is less than 0.5 time of clock period and how many of them says delay is more than 0.5 time of the clock period. If later wins then use negative latch otherwise positive latch and select delay from the plurality of CMOS buffers' at the input of plurality of D-flip-flops won over voting and fed to C8TX replica module.

Accordingly, one or more of the example embodiments herein disclose methods for controlling a multicycle path in a serializer interface. The method includes detecting whether a delay in a multicycle data path in a serializer interface is less than a desired value, and controlling a direction of a clock of a latch for the multicycle data path in the serializer interface based on results of the detecting.

In at least one example embodiment, the desired and/or predefined value is 0.5 unit interval (UI).

Accordingly, one or more of the example embodiments herein disclose a circuit for controlling a multicycle data path in a serializer interface. The circuit includes serializer delay replica circuitry configured to determine a desired delay window of a multicycle data path in a serializer interface by sampling at least one step response at serializer delay replica circuitry at an edge of a first clock signal and a gating signal, in response to synchronizing a second clock signal with a negative edge of the first clock signal, configure a polarity of a latch in a subsequent serializer of a serializer chain based on the determined desired delay window, and control the multicycle data path in the serializer interface based on the configured polarity of the latch in the subsequent serializer of the serializer chain.

Accordingly, one or more of the example embodiments herein disclose a circuit for controlling a multicycle data path in a serializer interface. The circuit includes serializer delay replica circuitry configured to detect whether a delay in a multicycle data path in a serializer interface is less than a desired value, and control a direction of a clock of a latch for the multicycle path in the serializer interface based on the detected delay.

These and other aspects of the example embodiments herein will be better appreciated and understood when considered in conjunction with the following description and the accompanying drawings. It should be understood, however, that the following descriptions, while indicating various example embodiments of the inventive concepts and numerous specific details thereof, are given by way of illustration and not of limitation. Many changes and modifications may be made within the scope of the example embodiments herein without departing from the scope thereof, and the example embodiments herein include all such modifications.

BRIEF DESCRIPTION OF FIGURES

Various example embodiments are illustrated in the accompanying drawings, throughout which like reference letters indicate corresponding parts in the various figures. The example embodiments will be better understood from the following description with reference to the drawings, in which.

DETAILED DESCRIPTION

Various example embodiments of the inventive concepts are described herein and the various features and/or details thereof are explained more fully with reference to the accompanying drawings. Descriptions of well-known components and processing techniques are omitted so as to not unnecessarily obscure the example embodiments herein. The description herein is intended merely to facilitate an understanding of ways in which the example embodiments herein can be practiced and to further enable those of ordinary skill in the art to practice one or more of the example embodiments herein. Accordingly, this disclosure should not be construed as limiting the scope of the example embodiments herein.

Figure 1:
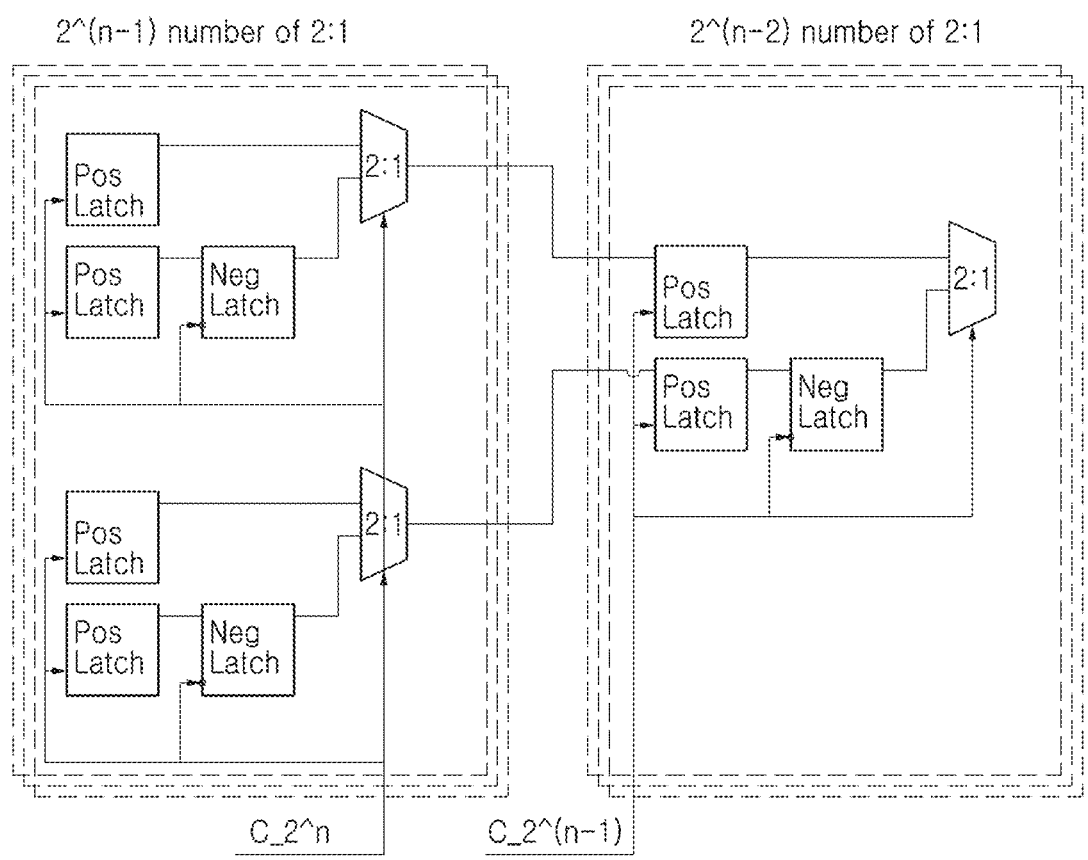
FIG. 1 is a circuit diagram of a serializer, according to the prior art.

FIG. 1 is a circuit diagram (100) of a serializer, according to the prior art. In general, the serializer includes a multiplexer, a positive latch and a negative latch. The conventional serializer serializes (e.g., converts) parallel data to serial data, and the basic building block of the conventional serializer is a 2:1 multiplexer (MUX). If a user needs to build 64:1 serializer, the data flow will be as follows:

a) 64 2:1 MUX running under a C64 clock signal (which is determined using a data rate divided by 64) to generate 32 bit data, b) 32 2:1 MUX running under a C32 clock signal (which is determined using a data rate divided by 32) to generate 16 bit data, c) 16 2:1 MUX running under C16 clock signal generating 8 bit data and so on.

Further, all of the divided clocks (e.g., C64, C32, C16, etc.) are either synchronous to a highest frequency clock available (e.g., C2, C4, etc.) or synchronous to a clock signal one step below (e.g. C32 is synchronous to C16 etc.). At every interface, C64→C32, C32→C16, C16→C8 etc., one must meet the following timing equation (1). But, it becomes more difficult to meet the timing equation (1) as the time period of $C\_2^{\wedge}(n-1)$ becomes shorter.

$$\text{Delay of } C\_2^{\wedge}n \text{ from } C\_2^{\wedge}(n-1) + \qquad (1)$$
$$\text{2:1 data path delay+setup of next synchronizer} <$$
$$\text{period of } C\_2^{\wedge}(n-1) \text{ clock}$$

Figure 2:
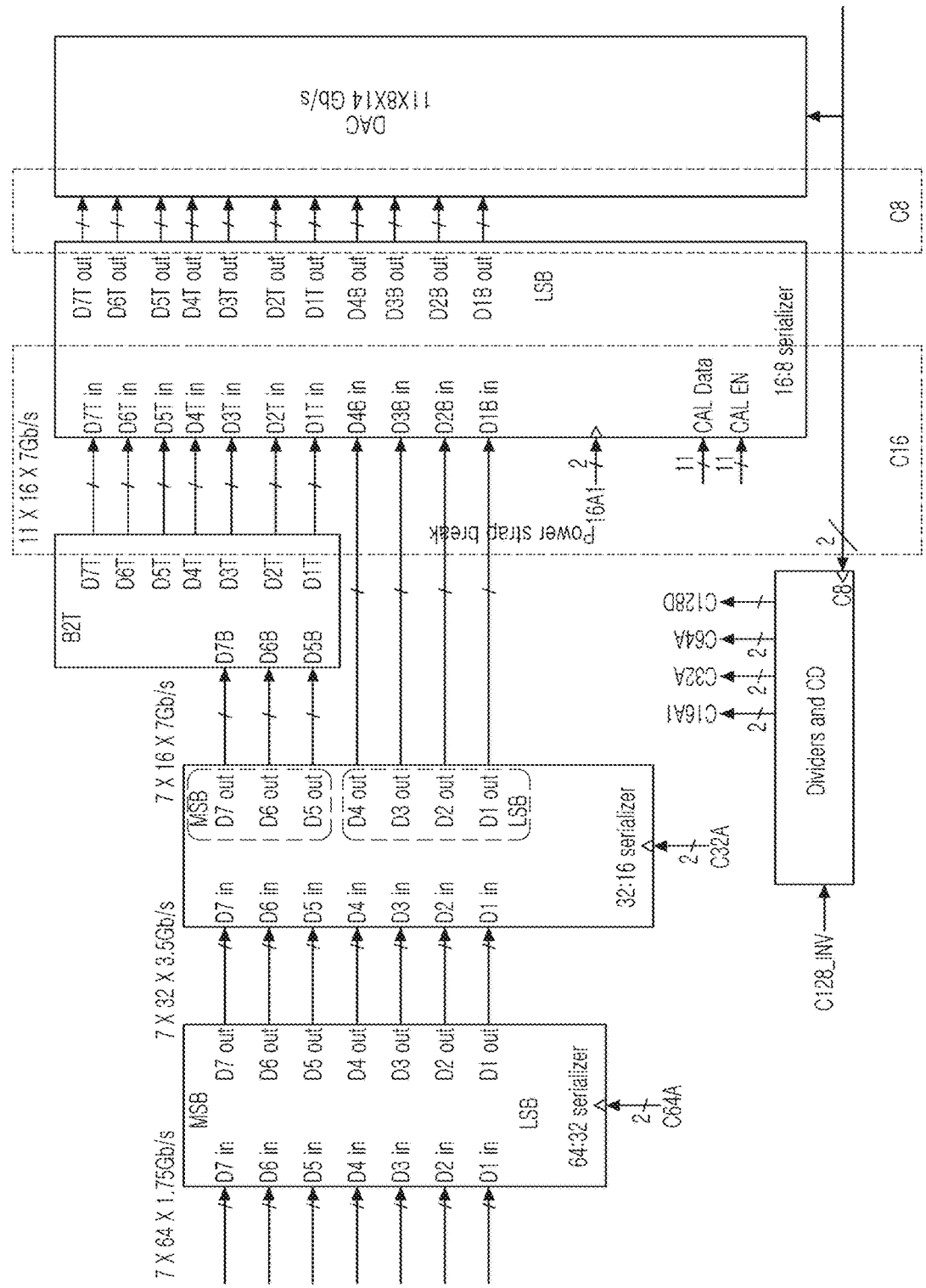
FIG. 2 is a circuit diagram of a basic block diagram of data path in the serializer, according to the prior art.

In an example, for a pulse amplitude modulation 4-level (PAM4) transmitter the number of serializers included in the conventional PAM4 transmitter will increase in accordance with a digital-to-analog converter (DAC) driver width, and additionally the plurality of serializers will be instantiated multiple times in order to output multiple serial bits (as shown in FIG. 2). Due to the large number of serializers and/or the number of levels (e.g., stages) of serializers included in the conventional PAM4 transmitter, a clock load of the conventional PAM4 transmitter increases and it becomes even difficult to meet desired and/or required timing requirements, e.g., when the $C\_2^{\wedge}(n-1)$ period reduces and/or becomes shorter, etc. Due to a DAC linearity requirement, the number of serializers increases further when a binary-to-thermometer (Bin2Therm) converter is introduced and/or connected to the PAM4 transmitter, and that in turn further increases the timing issue.

In other words, a conventional PAM4 serializer contains multiple serializer units (e.g., 4 to 12, etc.) in accordance to the driver DAC width. A clock network depth of different divided clocks used in serialization process may be very long and may come with high network delay. Unlike digital system-on-a-chip (SoC) where the clock network depth may be improved using a data path delay, pipeline re-timer, or the like, improvement of the timing issue of the conventional serializer at one stage of the serializer using traditional techniques would just push the timing problem to the subsequent stages, and cause the subsequent stages to work at higher data rates, e.g., C64→C32→C16→C8→C4.

It has been observed that if this timing problem is not addressed before C8 then it is impossible to solve. In order to maintain the DAC linearity, a Bin2Therm would need to be in the serializer's data path and it is observed that a C16-C8 interface is the best interface in terms of area (e.g., reduced physical area on semiconductor, etc.) and/or power overhead, etc. Therefore, the C16-C8 interface is a desired interface in these serializers to meet the basic timing equation of the serializer as shown in equation (2):

$$2:1\_delay + Tcq + Tsetup < Tc8 \, ( \sim 60ps) \quad (2)$$

FIG. 2 is a circuit diagram (200) of a basic block diagram of data path (e.g., serializer data path) according to the prior art. Whenever the data rate of the data path goes above 32 Gbs, a PAM4 transmitter, for example, a 224G PAM4 transmitter, has multiple serializer along with multiple data paths, respectively. When the multiple serializer work with same clock rate, the clock distribution among the multiple serializers is very critical. So, it is desired to find methods for clock distribution among multiple serializers without any issue. In general, when a circuit, such as the circuit shown in circuit diagram (200), has a long clock tree structure, the long clock tree structure may not meet the jitter requirement (and/or desired jitter conditions) of the circuit, etc. Further, with respect to data rates above 32 Gbs, the circuit cannot increase and/or enlarge the clock tree structure. If the circuit increases the clock tree structure, it may affect the performance (e.g., delay, etc.) of the circuit.

In FIG. 2, for example, a C64A interface is operated at 7×64×1.75 Gb/s. A C32A interface is operated at 7×32×3.5 Gb/s. A C16A interface is operated at 11×16×7 Gb/s. A C8 interface is operated at 11×8×14 Gb/s.

Figure 3:
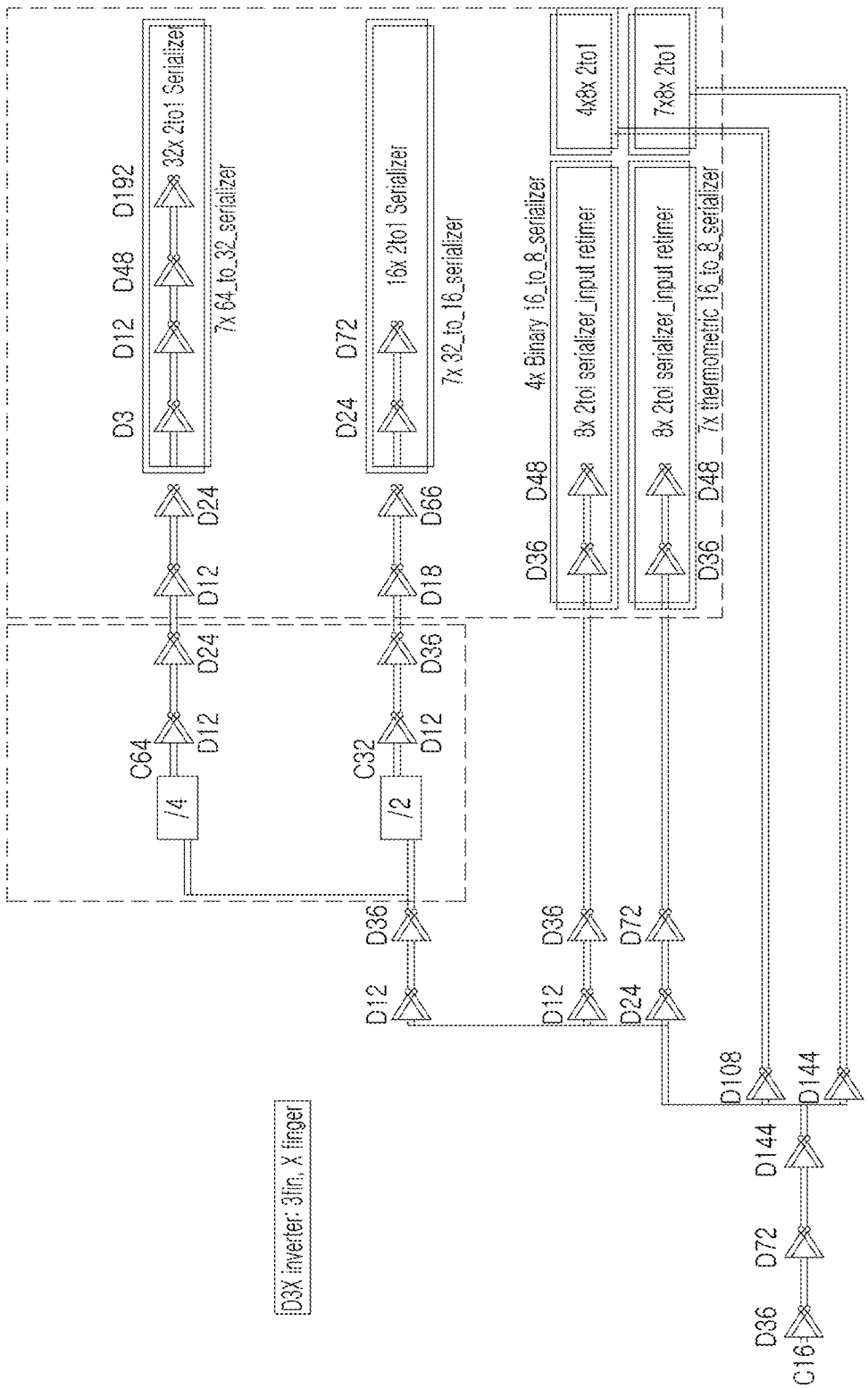
FIG. 3 is a circuit diagram of a clock distribution with tapering in conjunction with FIG. 2, according to the prior art.

FIG. 3 is a circuit diagram (300) of a clock distribution with tapering in conjunction with FIG. 2, according to the prior art. The clock distribution with the tapering is operated based on the existing methods or techniques. However, the inventors have observed, and as discussed further in connection with at least one example embodiment, the clock distribution with tapering may be improved and/or optimized depending on and/or based on drive capability.

Figure 4A:
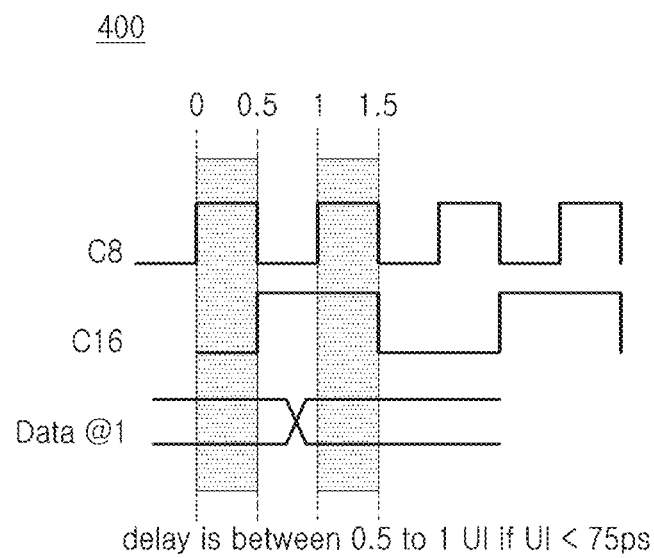
FIGS. 4A to 4B are graphs illustrating a delay in conjunction with FIG. 2, according to the prior art.
Figure 4B:
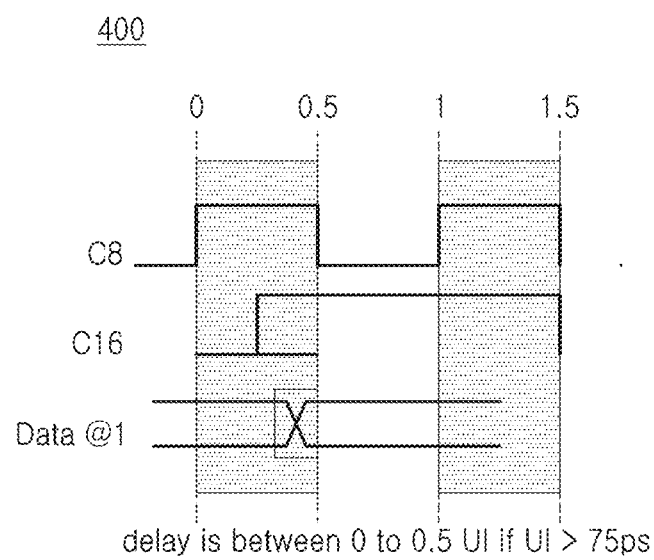

FIG. 4A and FIG. 4B are graphs (400) illustrating a delay in conjunction with FIG. 2, according to the prior art. In FIG. 4A, there is delay between 0.5 to 1 unit interval (UI) if the UI<75 ps. In FIG. 4B, there is a delay between 0 to 0.5 UI if the UI>75 ps. At a highest data rate, if the delay is restricted between some known limit, a positive latch of the C8 clock provides the most power optimized solution. However, the maximum delay may be restricted below 1.5 UI. For this example, the minimum delay is restricted above 0.5 UI. However, the constraints of a circuit design may not be met. Additionally, there may be a need and/or desire to support multiple data rates for several reasons. The delay could be different in actual silicon (e.g., when the circuit is fully fabricated and/or manufactured) rather than a computer (e.g., SPICE, etc.) simulation. For example, if the desired delay is 21 0.5 UI then the C8-newg-edge-C16 may be used. But, the boundary of a circuit design failure may not be defined strictly. Therefore, there is a need and/or desire to provide a delay detection scheme, method, process, and/or protocol, which will determine whether to use a negative edge-C16 or positive-edge C16 generation. According, one or more of the example embodiments of the inventive concepts improves and/or solves these timing issue at C16-C8 interfaces.

It is further desired to address the above-mentioned disadvantages and/or other short comings and/or to provide useful alternatives and/or improvements.

Accordingly, various example embodiments herein are directed to methods for controlling a multicycle path in a serializer interface. The method includes determining, by a serializer delay replica unit (e.g., a serializer delay replica circuit, a serializer delay replica device, a serializer delay, etc.), a desired and/or optimal delay window by sampling at least one step response from the serializer delay replica unit at an edge of a first clock, and sampling a gating signal upon synchronizing a second clock with a negative edge of the first clock, but the example embodiments are not limited thereto. Further, the method includes configuring, by the serializer delay replica unit, a polarity of a latch in a subsequent serializer of a serializer chain (e.g., a plurality of connected serializers, etc.) based on the determined desired and/or optimal delay window, but is not limited thereto. Further, the method includes controlling, by the serializer delay replica unit, the multicycle path in the serializer interface based on the configured polarity of the latch in the subsequent serializer of the serializer chain, but the example embodiments are not limited thereto.

Unlike conventional methods of operating a serializer and systems including a conventional serializer, e.g., as discussed with reference to FIGS. 1 to 4B, the proposed methods and circuit support serializer circuits with higher data rate ranges, e.g., 56 to 224 Gbps, but are not limited thereto. The proposed methods reduces the power consumption and area (e.g., physical area) usage of the serializer circuit, PAM4 transmitter circuits, and/or systems including at least one serializer circuit, etc., over the conventional serializer circuits, PAM4 transmitter circuits, etc., but the example embodiments are not limited thereto. In one or more proposed circuits may be used in the transmitting data and/or the receiving of data using a same data rate, but are not limited thereto. In one or more proposed methods, a serializer/deserializer (SerDes) circuit, e.g., a 224G PAM4 Transmitter, etc., according to at least one example embodiment, may used in a cloud network and/or a data center, etc.

Referring now to FIGS. 5 through 12, where similar reference characters denote corresponding features consistently throughout the figures, there are shown one or more example embodiments.

Figure 5:
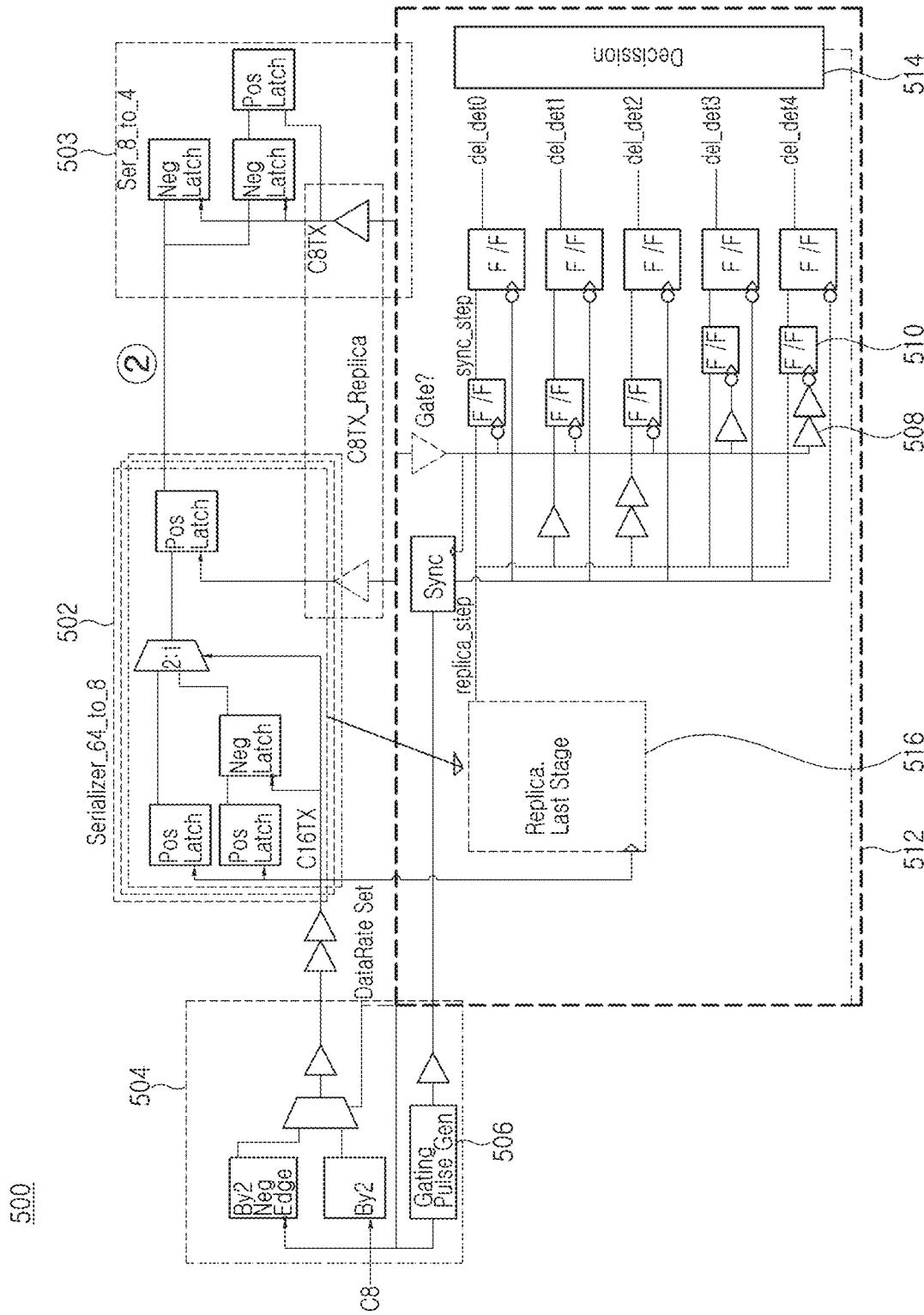
FIG. 5 shows a circuit for controlling a multicycle path in a serializer interface, according to at least one example embodiment.

FIG. 5 shows a circuit (500) for controlling a multicycle path in a serializer interface, according to at least one example embodiment, but the example embodiments are not limited thereto. The circuit (500) shows an example of a full implementation of 64:8 serializer (502) with 8:4 serializer interface (503) according to at least one example embodiment, but the example embodiments are not limited thereto. The 64:8 serializer (502) includes at least one multiplexer, a set of positive latches (e.g., a plurality of positive latches), which as shown in FIG. 5 is three, but is not limited thereto, and/or at least one negative latch, etc., but the example embodiments are not limited thereto. The 8:4 serializer interface (503) includes at least one positive latch and/or a set of negative latches (e.g., a plurality of negative latches), which as shown in FIG. 5 is two, but the example embodiments are not limited thereto. The circuit (500) includes a 64:8 serializer (502), an interface (2) with a timing path and/or a critical timing path being addressed in the circuit (500), a replica serializer data path (not shown), and/or a clock distribution (504), etc., but is not limited thereto. A pulse generation is shown inside the clock distribution (504), but the example embodiments are not limited thereto. The replica last stage is the same as the serializer 64_to_8

(e.g., 64:8 serializer (502)), or in other words, the replica last stage may be implemented as a serializer 64:8, but the example embodiments are not limited thereto. The pulse is generated by a pulse generator (506) at a desired clock frequency, e.g., a C128 frequency, etc., but is synchronous to a final launch clock frequency, e.g., a C8 clock frequency, etc., but is not limited thereto. The delay detection occurs for at least one power up sequence, and according to some example embodiments, for every power up sequence. The delay detection is used to choose a negative-edge based C16 versus a positive-edge based C16, or in other words, a negative-based clock or a positive-edge clock is selected based on the results of the delay detection. The detection operation is explained in below. A pulse generator (506) may include a basic divider (by2) circuit from a clock signal, e.g., the C8 clock, but is not limited thereto. The data pattern through the replica stage may receive data patterns, e.g., 16-1's and 16-0's pattern coming in a C16 domain, etc., so each bit will look like the clock signal (e.g., the C16 clock signal) itself. The serializer delay replica unit (512) includes at least one D-Flip-Flop (F/F) (510), and/or at least one Complementary metal-oxide-semiconductor (CMOS) buffer (shown as a triangle symbol in FIG. 5) (508), etc., but the example embodiments are not limited thereto. The serializer delay replica unit (512) also includes a decision block (e.g., decision circuitry, decision circuit, voting mechanism circuitry, etc.) which is a logic block (e.g., logic, logic circuit, logic circuitry, etc.) which may be called a majority voter and/or a voting mechanism (514). The decision block may be implemented as hardware or hardware circuitry including logic circuits.

In other words, the serializer delay replica unit (512) includes a replica last stage circuit (516) coupled to the plurality of CMOS buffers (508), where each CMOS buffer from the plurality of CMOS buffers (508) is coupled to each D-flip-flop from the plurality of D-flip-flops (510), respectively, but is not limited thereto. The replica last stage circuit (516) outputs the step response to the plurality of D-flip-flops and an output associated with each D-flip-flop is fed to the voting mechanism (514). An output (e.g., a voting signal) of the voting mechanism (514) is fed to, e.g., a C8TX replica module (e.g., C8TX replica circuit, etc.), but is not limited thereto.

The serializer delay replica unit (512) determines an desired and/or optimal delay window by sampling at least one step response from the serializer delay replica unit (512) at an edge of a first clock and the gating signal upon and/or in response to synchronizing a second clock with a negative edge of the first clock. In at least one example embodiment, the first clock is a C8 clock and the second clock is a C16 clock, but are not limited thereto. The desired and/or optimal delay window is determined using at least one sample, and the voting mechanism (514) in the serializer delay replica unit (512), but the example embodiments are not limited thereto, and for example, the determined delay window may be determined using multiple samples (e.g., a plurality of samples) and the voting mechanism (514), etc. The voting mechanism (514) determines how many of the plurality of D-flip-flops (510) determine the delay of the at least one sample is less than 0.5 time of the clock period (e.g., one half of the clock period) and how many of the D-flip-flops determine the delay of the at least one sample is more than 0.5 time of the clock period. If the delay of the one or more samples is more than 0.5 time of the clock period then the voting mechanism (514) uses the negative latch, and if the delay of the multiple samples is less than 0.5 time of clock period then, the voting mechanism (514) uses a positive latch. Then the voting mechanism (514) selects the delays from the plurality of CMOS buffers' (508) at the input of plurality of D-flip-flops (510) won over voting and is fed to the C8TX replica module.

Further, the serializer delay replica unit (512) configures a polarity of a latch in a subsequent serializer (not shown) of a serializer chain (e.g., a plurality of serializers connected together in the circuit 500) based on the determined desired and/or optimal delay window. In at least one example embodiment, the polarity of the latch in the subsequent serializer of the serializer chain is configured upon determining that the polarity is a positive polarity when the data delay of the multiple samples is less than 0.5 UI. In at least one example embodiment, the polarity of the latch in the subsequent serializer of the serializer chain is configured upon determining that the polarity is a negative polarity when a data delay of the multiple samples is greater than 0.5 unit interval (UI).

Further, the serializer delay replica unit (512) controls the multicycle path in the serializer interface based on the configured polarity of the latch in the subsequent serializer of the serializer chain. For example, upon determining that a total path delay is observed to be within 0.5 clock period to 1.5 clock period, the serializer delay replica unit (512) replaces a positive edge triggered flop with a negative edge triggered flop.

In at least one other example embodiment, the serializer delay replica unit (512) detects that a delay is less than a desired and/or predefined value. According to at least one example embodiment, the desired and/or predefined value is around 0.5 UI (e.g., within ±10% of 0.5 UI), but is not limited thereto. Further, the serializer delay replica unit controls the direction of the clock of a latch (e.g., which edge (negative or positive edge) of the clock to use to trigger the latch) for the multicycle path in the serializer interface upon detecting the delay of the replica serializer.

Figure 6:
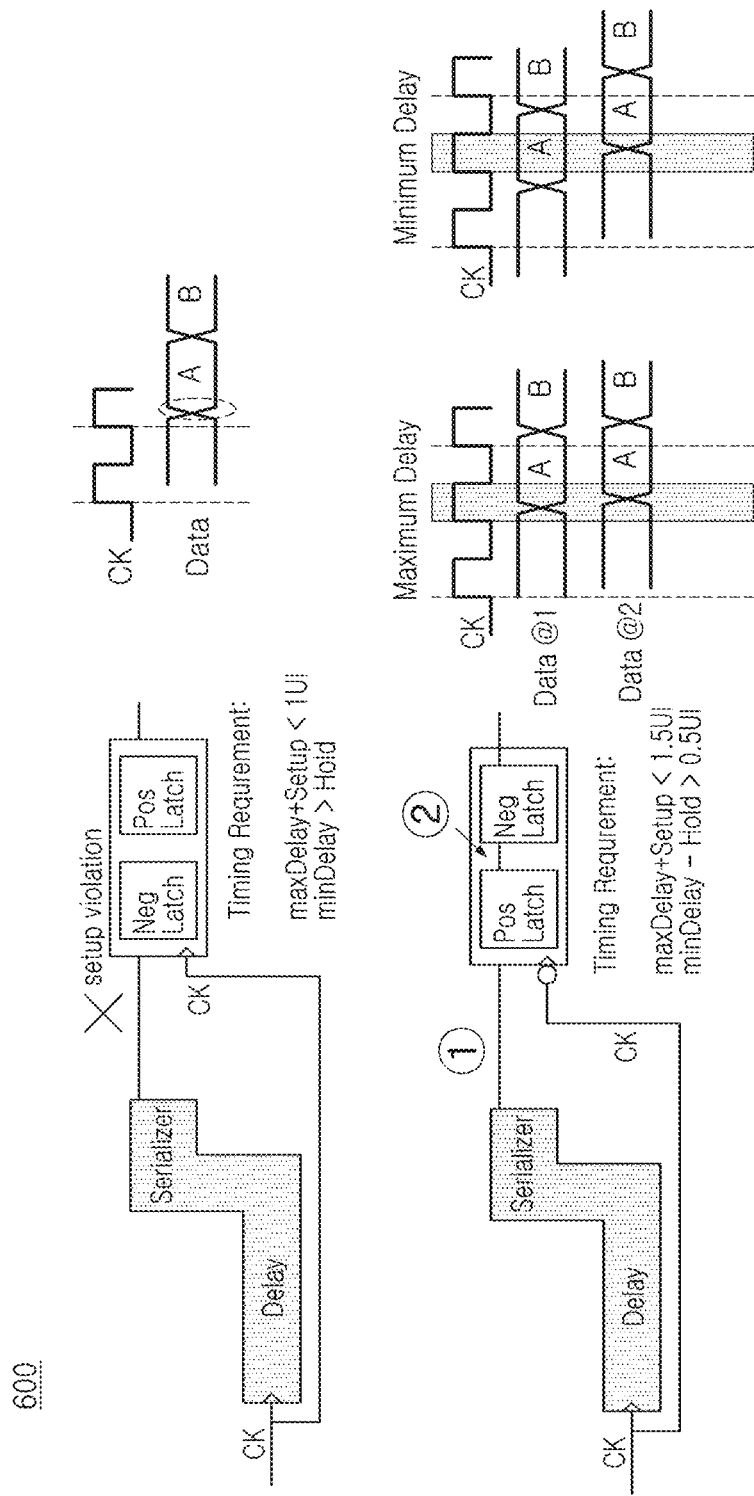
FIG. 6 to FIG. 7B are timing diagrams of an output delay variation during a positive level latch in conjunction with FIG. 5, according to at least one example embodiment.
Figure 7A:
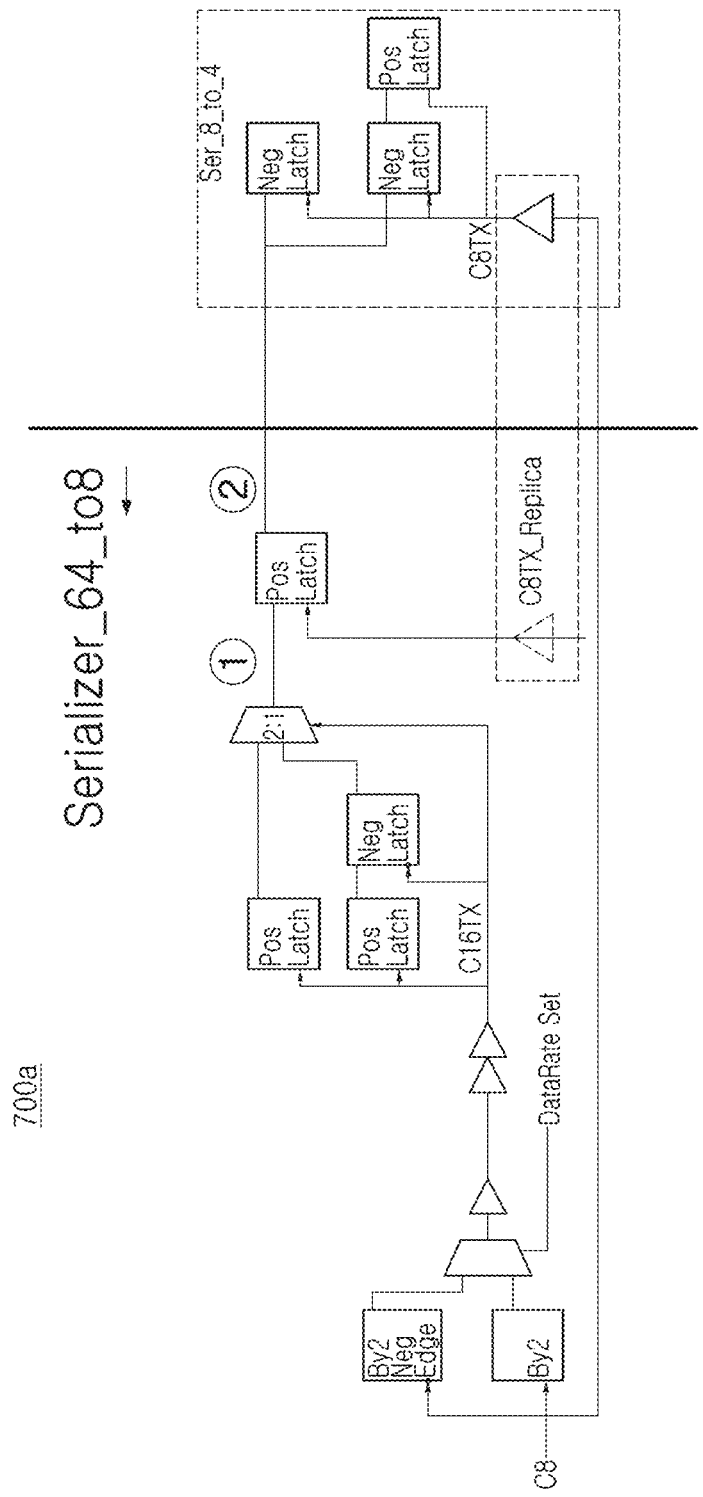
Figure 7B:
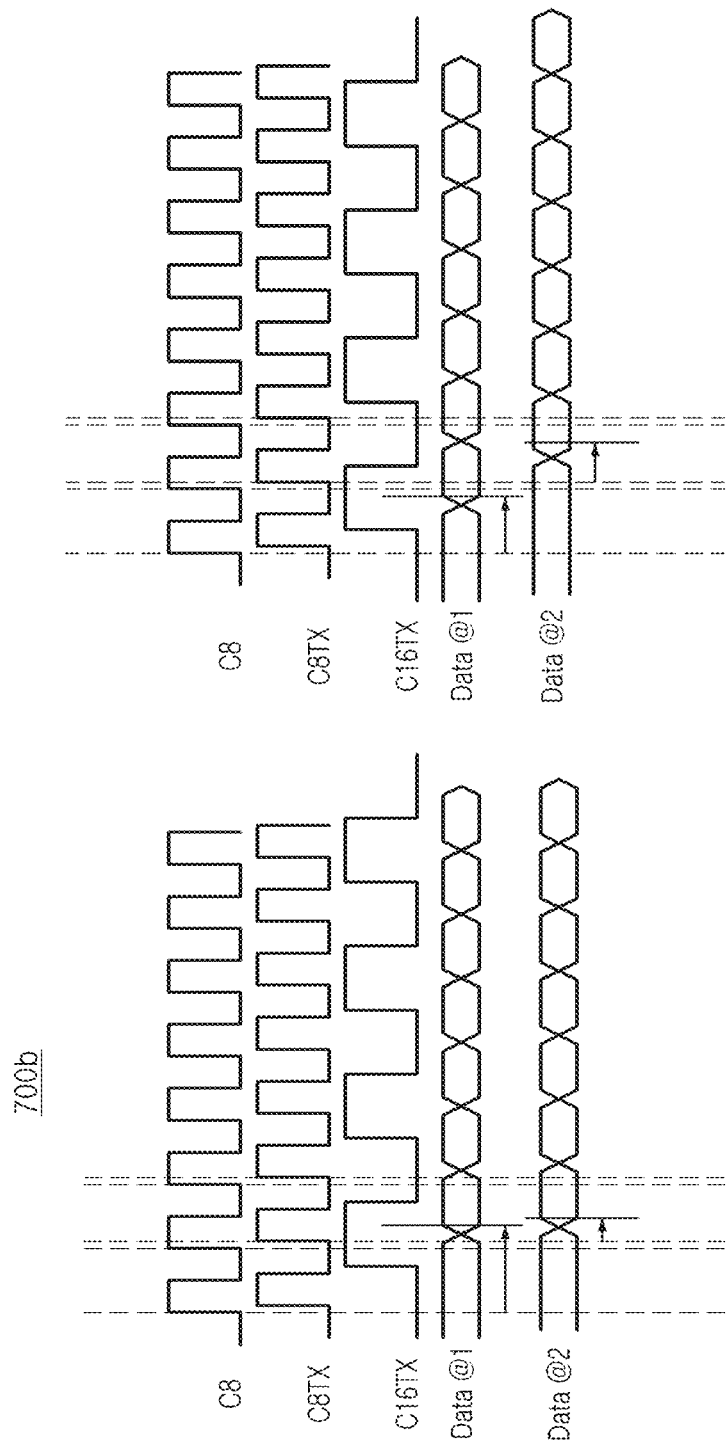

FIG. 6 to FIG. 7B are timing diagrams (600, 700A and 700B) of an output delay variation during the positive level latch in conjunction with FIG. 5, according to at least one example embodiment. In FIG. 7A, the C8 clock drives the serializer 64-to-8 and outputs data at a node 1 with a certain data path delay. A replica buffer has been employed in the re-timing path for the above delay for further serialization (example: a serializer 8-to-4 and so on). The re-timing element has been sub divided in latches and first positive latch has been kept near the serializer 64-to-8 and another towards a next set of serializer(s).

If the total path delay is observed to be within 0.5× to 1.5× of the clock period, the circuit may replace the positive edge triggered flop with the negative edge triggered flop. The pre-layout simulation shows the delay varies from 50 ps to 100 ps from fastest to slowest corner cases which meet the delay requirement if the C8 period is 70 to 80 ps.

It is probable that a minimum delay may violate the specification. It is also possible to violate maximum delay requirement. Further, the minimum delay and/or the maximum delay may be met by proper design but, if the nominal delay is larger than the delay variation will consequently be high and the proposed method may not meet the desired timing constraint.

Figure 8A:
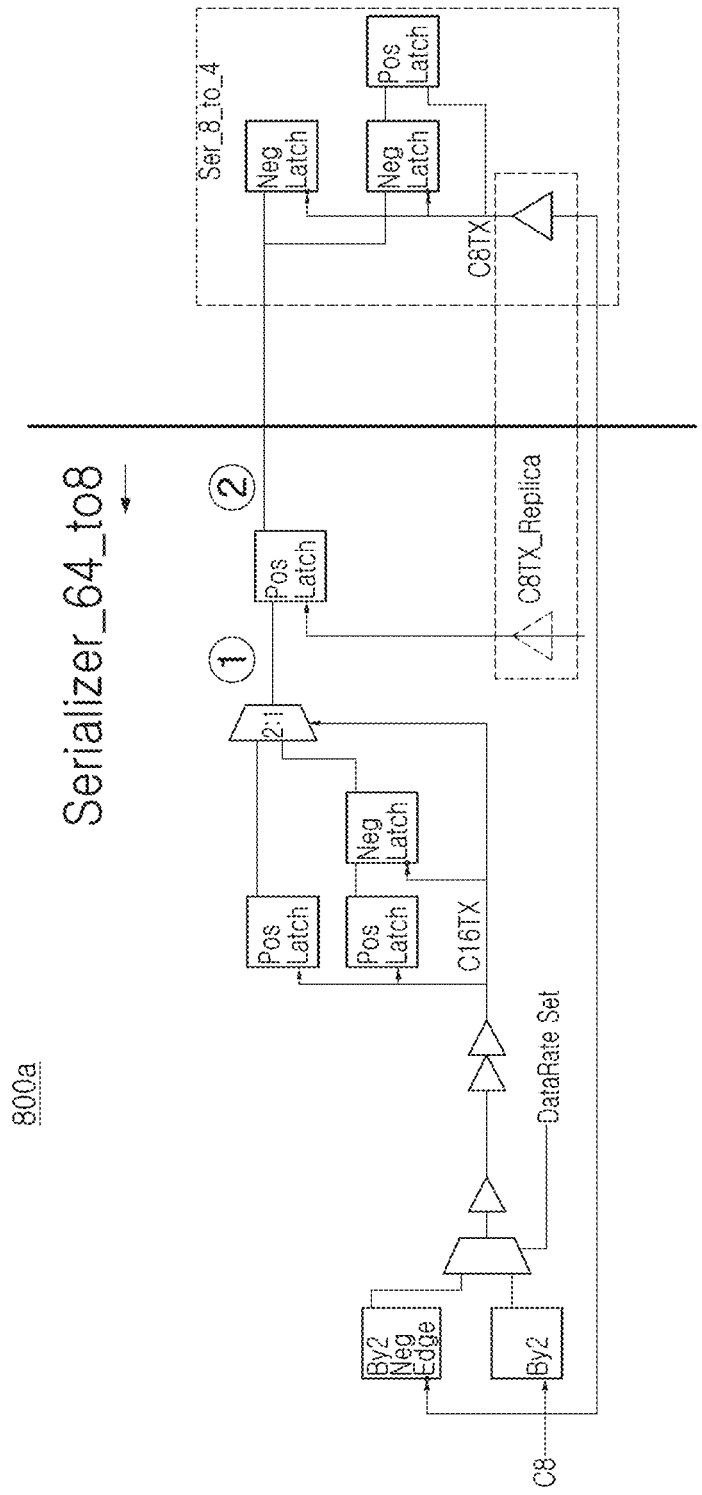
FIG. 8A and FIG. 8B are timing diagrams of an output data re-timing window during a slow data rate in conjunction with FIG. 5, according to at least one example embodiment.
Figure 8B:
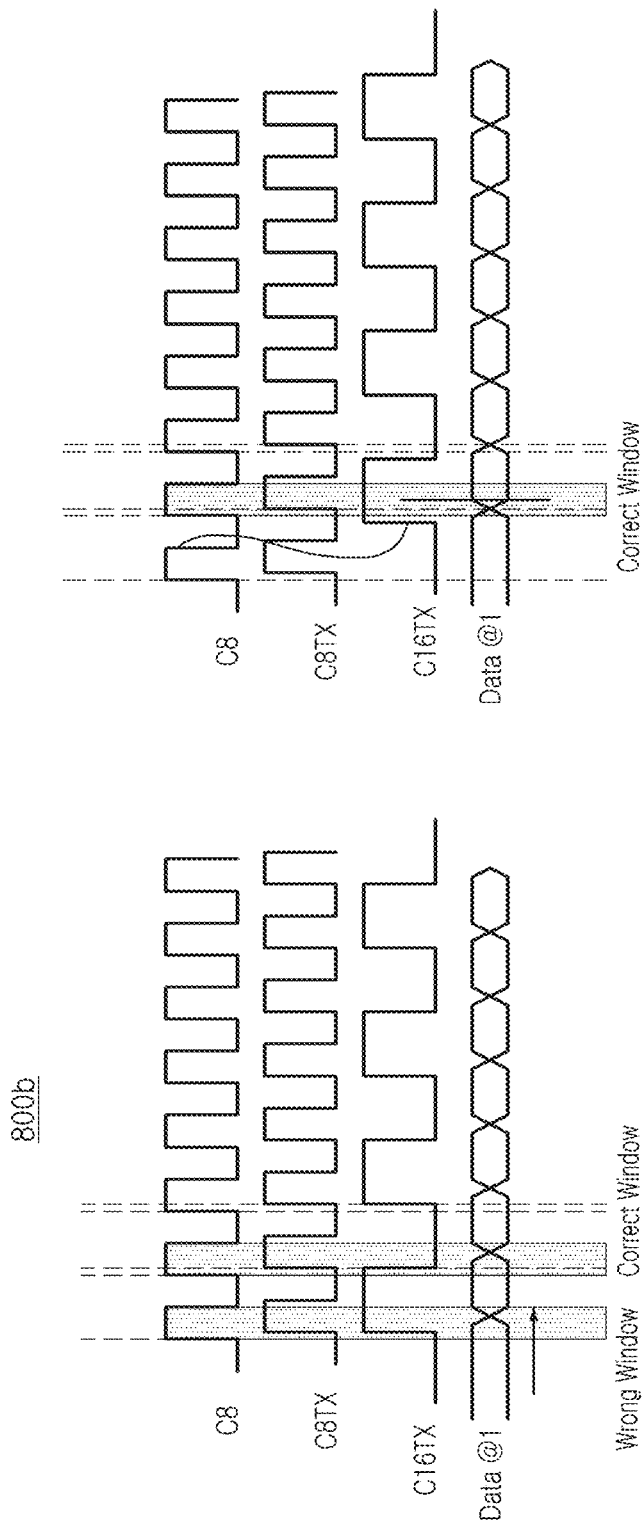

FIG. 8A and FIG. 8B are timing diagrams of an output data re-timing window during a slow data rate in conjunction with FIG. 5, according to at least one example embodiment. On the left, the data-rate is slow enough for the output data to fall in an incorrect timing window for proposed change in FIG. 6. On the right, the data rate is fast enough to meet the timing constraint.

If the data rate is slow enough to see that the maximum delay is always lower than 0.5× of the clock period, this timing fails. However, if the data rate is known, this can be solved using a simple MUX and C16TX clock synchronized using the negative edge of the C8 clock. This simple change will make sure this implementation work at any lower data rate possible. The same thing is indicated in the FIG. 8B.

Figure 9A:
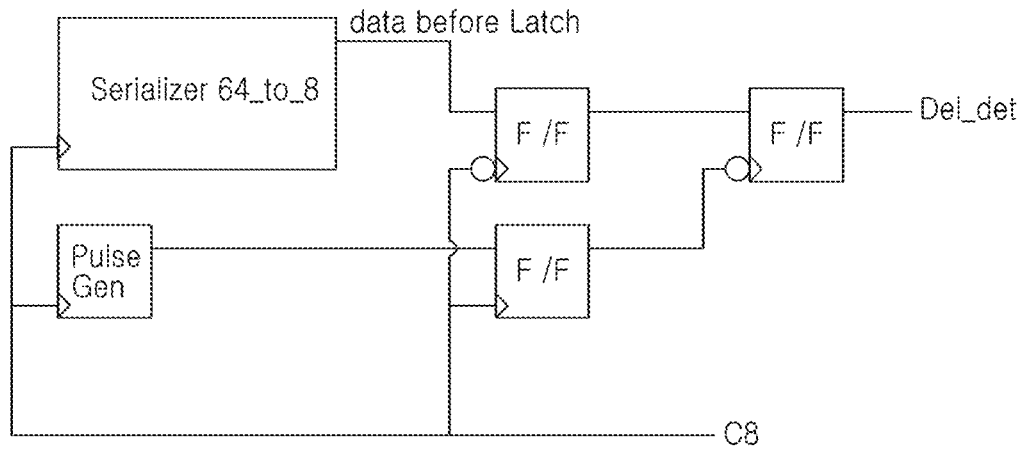
FIG. 9A and FIG. 9B represent a delay detection scheme in conjunction with FIG. 5, according to at least one example embodiment.
Figure 9B:
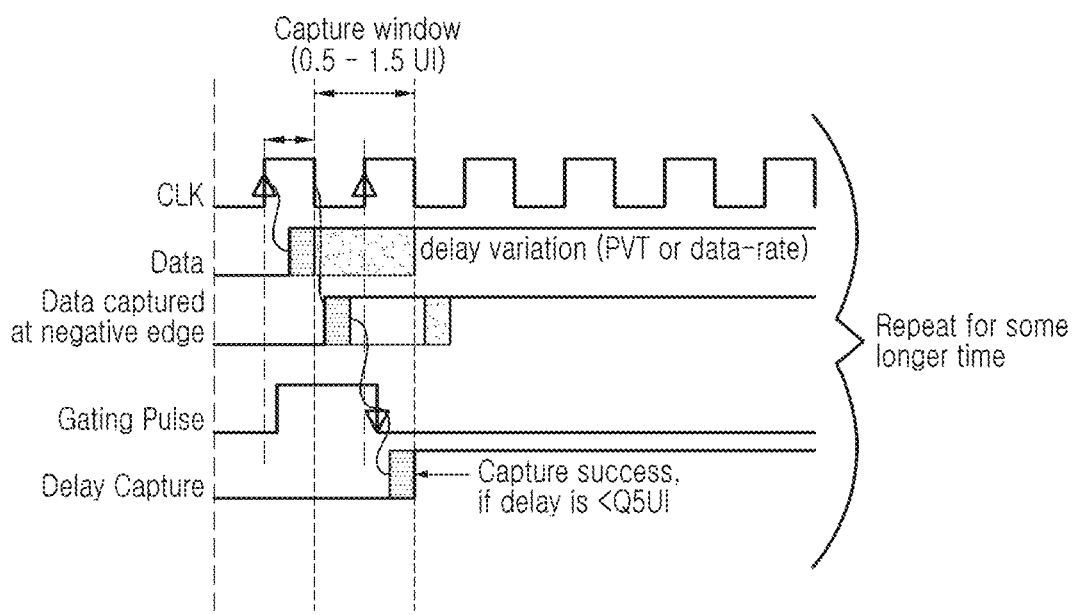

FIG. 9A and FIG. 9B represent (900a and 900b) a delay detection scheme in conjunction with FIG. 5, according to at least one example embodiment. The detection scheme is to find if the delay is less than <0.5 UI for a desired and/or given condition. For example, the replica serializer and the pulse generator (506) working under C8 clock, but are not limited thereto. The pulse generator output captures the replica serializer output and further processes it to detect the data path delay.

In the process, the detection scheme samples the data-step (e.g., step response), after the whole chain of the serializer, with the negative edge of C8 clock [0.5 UI]. Further, the detection scheme ensures that the negative edge gets generated in between 2 known positive edges of the C8 clock and the gating signal. Then, the detection scheme re-samples the data with the gating signal negative edge. If the final output is 1 then, the delay is <0.5 ps. If the final output is 0 then, the delay is >0.5 ps.

Figure 10A:
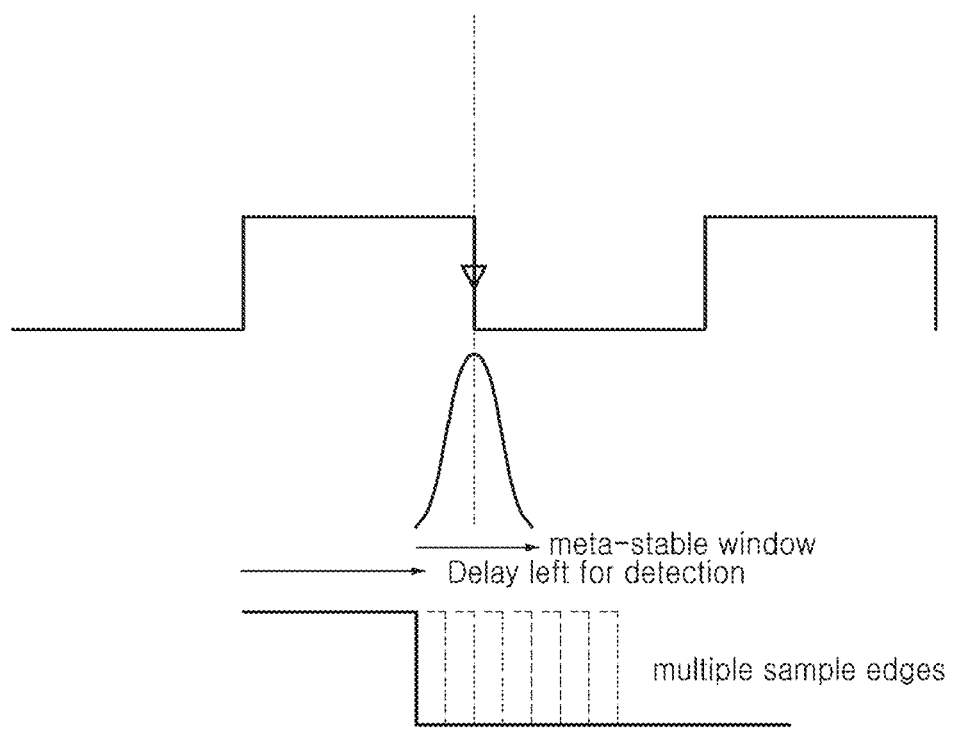
FIG. 10A to FIG. 10C are timing diagrams illustrating a delay detection scheme considering metastable timing window in conjunction with FIG. 5, according to at least one example embodiment.
Figure 10B:
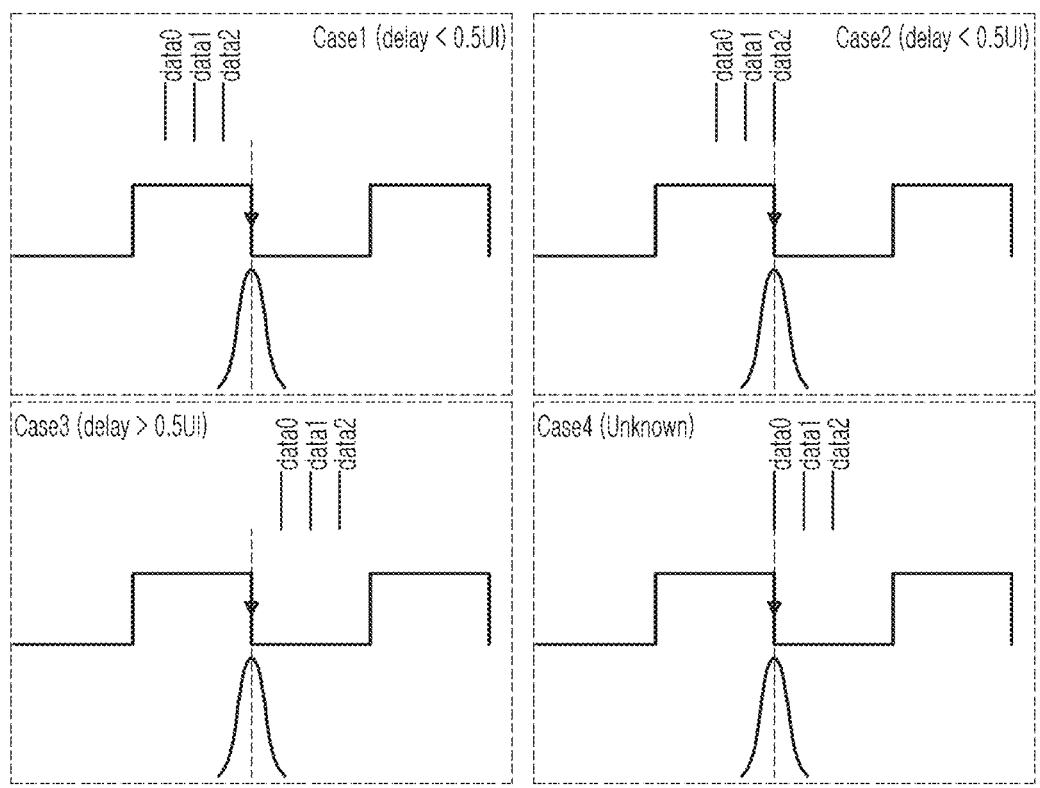
Figure 10C:
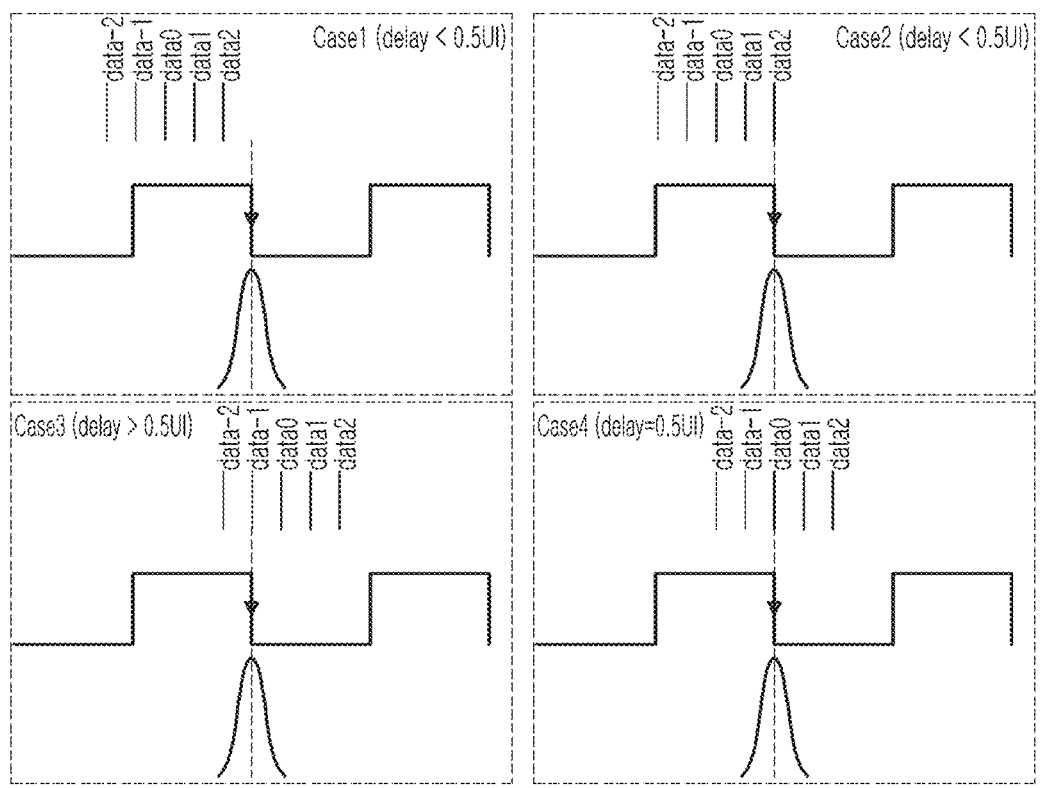

FIG. 10A to FIG. 10C are timing diagrams (e.g., 1000a to 1000c) illustrating the delay detection scheme considering metastable timing window in conjunction with FIG. 5, according to at least one example embodiment, but the example embodiments are not limited thereto.

In FIG. 10A, a meta-stable window is shown around a negative edge first C8 flipflop (FF). The skew of a C16 clock and/or ser2to1 MUX may be propagated across all 88 serializers.

As shown in FIG. 10B, during the multiple data samples, if delayed data (from multiple) samples are used to detect delay, the delay range should be more than a desired uncertainty window. But, the data0 may fall just at the boundary meta-stable window.

As shown in FIG. 10C, during the multiple capture clocks, the user of the circuit will get a negative delay in the data to cover both sides of data0.

Figure 11:
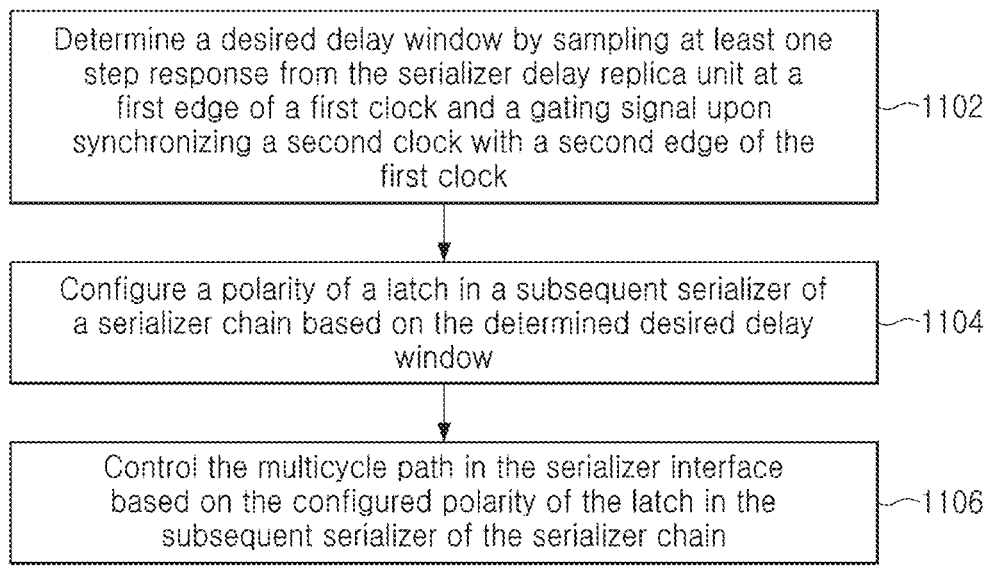
FIG. 11 and FIG. 12 are flow charts illustrating methods for controlling the multicycle path in the serializer interface, according to at least one example embodiment.
Figure 12:
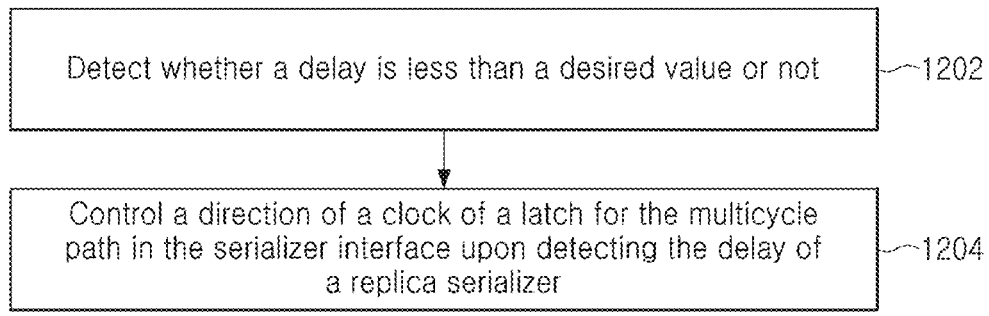

FIG. 11 and FIG. 12 are flow charts (e.g., 1100 and 1200) illustrating at least one method for controlling the multicycle path in the serializer interface, according to at least one example embodiment.

As shown in FIG. 11, at operation 1102, the method includes determining the desired and/or optimal delay window by sampling at least one step response from the serializer delay replica unit (512) (e.g., serializer delay replica circuit) at the edge of the first clock and the gating signal upon and/or in response to synchronizing the second clock with the negative edge of the first clock. At operation 1104, the method includes configuring the polarity of the latch in the subsequent serializer of the serializer chain based on the determined desired and/or optimal delay window. At operation 1106, the method includes controlling the multicycle path in the serializer interface based on the configured polarity of the latch in the subsequent serializer of the serializer chain.

As shown in FIG. 12, at operation 1202, the method includes detecting whether the delay is less than a desired and/or predefined value. At operation 1204, the method includes controlling the direction of the clock of the latch for the multicycle path in the serializer interface upon detecting the delay of a replica serializer is less than the desired and/or predefined value.

The various actions, acts, blocks, operations, or the like in the flow charts (e.g., 1100 and 1200) may be performed in the order presented, may be performed in a different order, and/or may be performed simultaneously. Further, in some example embodiments, some of the actions, acts, blocks, operations, or the like, may be omitted, added, modified, skipped, or the like without departing from the scope of the example embodiments of the inventive concepts.

The foregoing description of various example embodiments of the inventive concepts reveal the general nature of the example embodiments which may be readily modified and/or adapted for various applications by persons of ordinary skill in the art, and such adaptations and modifications should and are intended to be comprehended within the scope of the example embodiments of the inventive concepts. It is to be understood that the phraseology and/or terminology employed herein is for the purpose of description and not of limitation.

We claim:

1. A method for controlling a multicycle data path in a serializer interface, comprising:
   determining a desired delay window of a multicycle data path in a serializer interface by sampling at least one step response from serializer delay replica circuitry at an edge of a first clock signal and a gating signal, in response to synchronizing a second clock signal with a negative edge of the first clock signal;
   configuring a polarity of a latch in a subsequent serializer of a serializer chain based on the determined desired delay window; and
   controlling the multicycle data path in the serializer interface based on the configured polarity of the latch in the subsequent serializer of the serializer chain.

2. The method as claimed in claim 1, wherein
   the first clock signal is a C8 clock signal, and
   the second clock signal is a C16 clock signal.

3. The method as claimed in claim 1, wherein the configuring the polarity of the latch in the subsequent serializer of the serializer chain further includes:
   configuring the polarity to be a positive polarity in response to a data delay of the sampled at least one step response being less than 0.5 unit interval (UI).

4. The method as claimed in claim 1, wherein the configuring the polarity of the latch in the subsequent serializer of the serializer chain further includes:
   configuring the polarity to be a negative polarity in response to a data delay of the sampled at least one step response being greater than 0.5 UI.

5. The method as claimed in claim 1, wherein the determining the desired delay window includes using a plurality of samples.

6. The method as claimed in claim 1, further comprises:
   determining whether a total path delay is observed to be within 0.5 clock period to 1.5 clock period; and
   replacing a positive edge triggered flop with a negative edge triggered flop based on results of the determining.

7. The method as claimed in claim 1, wherein the serializer delay replica circuitry comprises:
   replica last stage circuitry coupled to a plurality of complementary metal-oxide semiconductor (CMOS) buffers;
   each CMOS buffer from the plurality of CMOS buffers is coupled to each D-flip-flop from a plurality of D-flip-flops, respectively;
   each of the D-flip-flops configured to provide an output signal to voting mechanism circuitry; and the voting mechanism circuitry is configured to provide a voting signal to a C8TX replica circuit.

8. A circuit for controlling a multicycle data path in a serializer interface, comprising:
serializer delay replica circuitry configured to:
determine a desired delay window of a multicycle data path in a serializer interface by sampling at least one step response at the serializer delay replica circuitry at an edge of a first clock signal and a gating signal, in response to synchronizing a second clock signal with a negative edge of the first clock signal;
configure a polarity of a latch in a subsequent serializer of a serializer chain based on the determined desired delay window; and
control the multicycle data path in the serializer interface based on the configured polarity of the latch in the subsequent serializer of the serializer chain.

9. The circuit as claimed in claim 8, wherein
the first clock signal is a C8 clock signal, and
the second clock signal is a C16 clock signal.

10. The circuit as claimed in claim 8, wherein the serializer delay replica circuitry comprises:
replica last stage circuitry coupled to a plurality of complementary metal-oxide semiconductor (CMOS) buffers,
the plurality of CMOS buffers are coupled to a plurality of D-flip-flops, and
the plurality of D-flip-flops is coupled to voting mechanism circuitry.

11. The circuit as claimed in claim 10, wherein
each CMOS buffer from the plurality of CMOS buffers is coupled to each D-flip-flop from the plurality of D-flip-flops, respectively,
each D-flip-flop is configured to provide an output signal to the voting mechanism circuitry, and
the voting mechanism circuitry is configured to output a voting signal to a C8TX replica circuit.

12. A circuit for controlling a multicycle data path in a serializer interface, comprising:
serializer delay replica circuitry configured to:
detect whether a delay in a multicycle data path in a serializer interface is less than a desired value; and
control a direction of a clock of a latch for the multicycle path in the serializer interface based on the detected delay.

13. The circuit as claimed in claim 12, wherein the desired value is 0.5 unit interval (UI).

14. The circuit as claimed in claim 12, further comprising:
replica last stage circuitry coupled to a plurality of complementary metal-oxide semiconductor (CMOS) buffers,
each CMOS buffer from the plurality of CMOS buffers is coupled to each D-flip-flop from a plurality of D-flip-flops, respectively,
each D-flip-flop is configured to provide an output to voting mechanism circuitry, and
the voting mechanism circuitry is configured to provide a voting output signal to a C8TX replica circuit.

* * * * *